United States Patent
Rider et al.

(10) Patent No.: US 10,061,357 B2
(45) Date of Patent: Aug. 28, 2018

(54) ELECTROACTIVE LAYER TO COIL A FLEXIBLE DISPLAY

(71) Applicant: INTEL CORPORATION, Santa Clara, CA (US)

(72) Inventors: Tomer Rider, Naahryia (IL); Dor Levy, Jerusalem (IL); Ramon C. Cancel Olmo, Hillsboro, OR (US); Paul J. Gwin, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 14/735,566

(22) Filed: Jun. 10, 2015

(65) Prior Publication Data

US 2016/0363959 A1    Dec. 15, 2016

(51) Int. Cl.
*G06F 1/00* (2006.01)
*G06F 1/16* (2006.01)

(52) U.S. Cl.
CPC .................. *G06F 1/1652* (2013.01)

(58) Field of Classification Search
CPC ............ G06F 1/1652; G09G 2380/02
USPC .......................................................... 313/508
See application file for complete search history.

(56) References Cited

U.S. PATENT DOCUMENTS

| | | | | |
|---|---|---|---|---|
| 2002/0180709 A1* | 12/2002 | Lichtfuss | ............ | G06F 1/1626 345/173 |
| 2003/0048256 A1* | 3/2003 | Salmon | ................ | G06F 1/1613 345/168 |
| 2007/0241002 A1 | 10/2007 | Wu et al. | | |
| 2008/0303782 A1 | 12/2008 | Grant et al. | | |
| 2011/0095975 A1* | 4/2011 | Hwang | ................ | G06F 1/1626 345/156 |
| 2011/0227822 A1* | 9/2011 | Shai | ..................... | G06F 1/1615 345/156 |
| 2013/0265631 A1 | 10/2013 | Ahn et al. | | |
| 2013/0286462 A1 | 10/2013 | Yeo et al. | | |
| 2013/0314762 A1* | 11/2013 | Kwack | .................... | G02F 1/09 359/280 |
| 2014/0098075 A1 | 4/2014 | Kwak et al. | | |
| 2016/0034000 A1* | 2/2016 | Lee | ....................... | G06F 1/1652 361/749 |

OTHER PUBLICATIONS

PCT International Search Report and Written Opinion, PCT Application No. PCT/US2016/027727, dated Aug. 4, 2016, 15 pages.
Ashley, Steven; Artificial Muscles; Scientific American, Inc.; Oct. 2003; 8 pages.
Author Unknown; "Comparison of EAPs with Other Actuator Technologies;" from from NASA Jet Propulsion Laboratory; viewed on Sep. 1, 2015, available at: http://ndeaa.jpl.nasa.gov/nasa-nde/lommas/eap/actuators-comp.pdf; 3 pages.

(Continued)

*Primary Examiner* — Christopher Raabe
(74) *Attorney, Agent, or Firm* — International IP Law Group P.L.L.C.

(57) ABSTRACT

Techniques related to a method, apparatus, and system for flexible displays are described herein. For example, an apparatus may include a flexible display and an electroactive layer. Shape changes in the electroactive layer generate shape changes in the flexible display. The shape changes include one or more coil turns configured to coil the flexible display.

13 Claims, 8 Drawing Sheets

(56) References Cited

OTHER PUBLICATIONS

Author Unknown; "Digital-to-analog converter;" from Wikipedia; viewed on Sep. 1, 2015, available at: http://en.wikipedia.org/wiki/Digital-to-analog_converter; 8 pages.
Author Unknown; "Rollable Display;" from Wikipedia; viewed on Sep. 1, 2015, available at: https://en.wikipedia.org/wiki/Match_moving#2D_vs._3D; 7 pages.
Author Unknown; "Rollable Display;" from Wikipedia; viewed on Sep. 1, 2015, available at: https://en.wikipedia.org/wiki/Rollable_display; 3 pages.
Author Unknown; WorldWide Electroactive Polymer Actuators Webhub; from NASA Jet Propulsion Laboratory; viewed on Sep. 1, 2015, available at: http://ndeaa.jpl.nasa.gov/nasa-nde/lommas/eap/EAP-web.htm; 7 pages.
Author Unknown; "PolyPower DEAP Material—A Technology for the Industry"; from Danfos PolyPower A/S; viewed on Sep. 1, 2015, available at: http://www.polypower.com/Technology/Overview/PolyPower+DEAP+Technology/ on the http://archive.is/HGMIk website, 1 page.
Endo et al.; "Virtual Grasping Assessment Using 3D Digital Hand Model"; from Institute of Industrial Engineers; viewed on Sep. 1, 2015, available at: https://www.iienet2.org/uploadedfiles/ergo_community/case_studies/35.pdf; 21 pages.
Huang, Gregory; "Electroactive Polymers"; WorldWide Electroactive Polymer Actuators Webhub; from NASA Jet Propulsion Laboratory; viewed on Sep. 1, 2015; http://www.technologyreview.com/article/401750/electroactive-polymers/; 2 pages.
Ingham, Lucy; "Turning Sketches Into 3D Models with the Click of a Button"; available at http://www.factor-tech.com/3d-modelling/7133-turning-sketches-into-3d-models-with-the-click-of-a-button/; 20 pages.
Levy et al., U.S. Appl. No. 14/581,477, filed in the USPTO Dec. 23, 2014, US Application, Drawings, and Filing Receipt dated Jan. 13, 2015 attached (28 pages), not yet published.
Moghimi, Reza; Seven Steps to Successful Analog-to-Digital Signal Conversion (Noise Calculation for Proper Signal Conditioning); Analog Device Services website www.analog.com; May 2011; 5 pages.
Rider et al., U.S. Appl. No. 14/581,438, filed in the USPTO Dec. 23, 2014, US Application, Drawings, and Filing Receipt dated Jan. 13, 2015 attached (27 pages), not yet published.
Zurich University of Arts; "Electroactive Polymers Part 1: Shower Hose Stretching Mechanism Video Tutorial"; viewed on Sep. 1, 2015, available at: https://www.youtube.com/watch?v=uw8FLgiXsmk; 24 pages.

* cited by examiner

300

700

ELECTROACTIVE LAYER TO COIL A FLEXIBLE DISPLAY

TECHNICAL FIELD

This disclosure relates generally to flexible displays. More specifically, the techniques described herein include using an electroactive material to coil a flexible display.

BACKGROUND ART

In computer systems, a display device may be used to display various image content. Flexible display devices are becoming increasingly common. As flexible displays become more ubiquitous, mechanisms may be useful for changing the shape of a flexible display.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for flexible displays coupled to an electroactive layer. As discussed above, curved display devices may be increasingly popular. Rolling up a curved display may provide ease of use. In the techniques described herein, the electroactive layer may be used to form one or more coil turns to coil, or roll up, the flexible display.

An electroactive layer may be a material responding in size or shape to an electric field. The electroactive layer may be composed of electroactive polymers (EAPs) for example. EAPs are polymers that exhibit a change in size or shape when stimulated by an electric field.

A flexible display may include any display that is flexible and may respond to changes in shape of the electroactive layer. For example, as current is provided to the electroactive layer, the electroactive layer may change in shape. Changes in the shape of the electroactive layer may be reflected by a change in shape at the flexible display. Therefore, a curve of a flexible display may be increased or reduced, based on user preferences, or other types of conditions discussed in more detail below.

Although aspects presented herein generally discuss one layer of electroactive material coupled to a flexible display, multiple layers may be implemented. In some cases, multiple layers may increase strength of by the combination of the flexible display and multiple electroactive layers. Further, in some cases, a shape formation effect may be increased by the use of multiple layers in various configurations, and are contemplated herein. In addition, although aspects presented herein generally provide a monolithic electroactive layer, discrete electroactive sections, or a monolithic electroactive layer having various cells configured to respond to electric force may be implemented, or any combination thereof.

Figure 1:
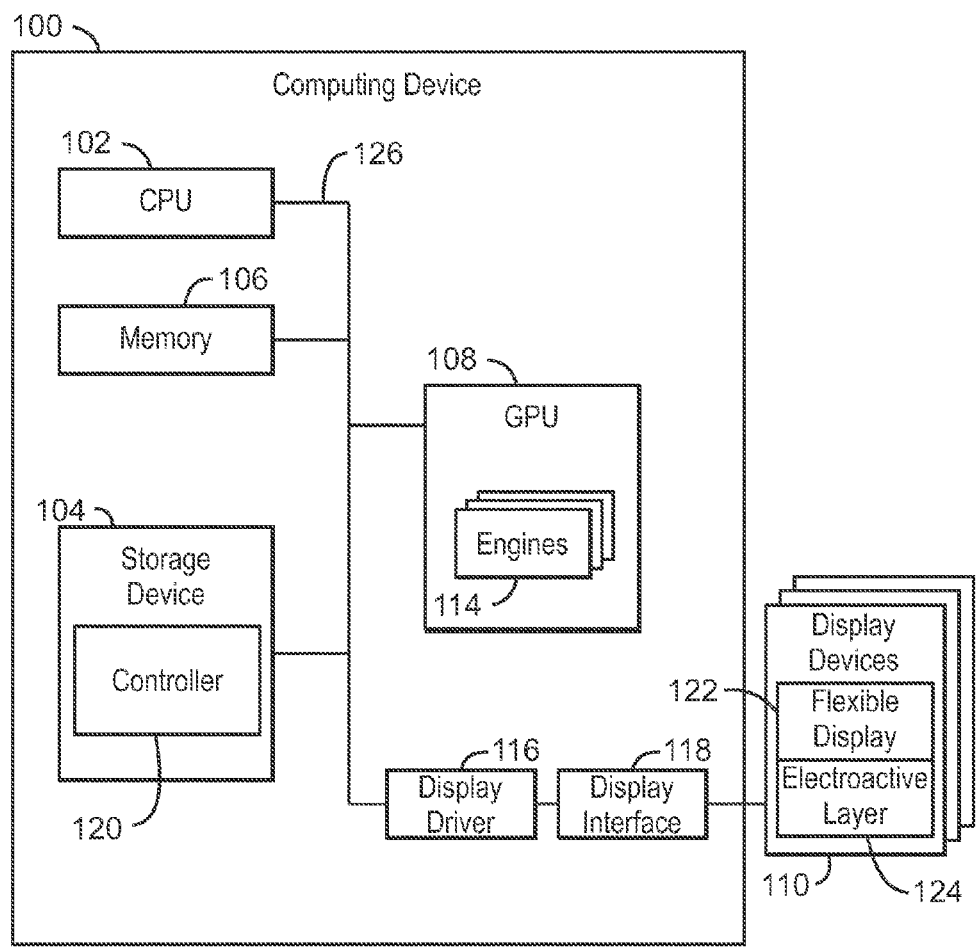
FIG. 1 is a block diagram illustrating a computing device configured to generate shape changes at a flexible display.

FIG. 1 is a block diagram illustrating a computing device configured to generate shape changes at a flexible display. The computing device 100 may be, for example, a laptop computer, desktop computer, ultrabook, tablet computer, mobile device, or server, among others. The computing device 100 may include a processing device 102 that is configured to execute stored instructions, as well as a storage device 104 including a non-transitory computer-readable medium, and a memory device 106.

The computing device 100 may also include a graphics processing unit (GPU) 108. In embodiments, the GPU 108 is a discrete processing component, is embedded in the processing device 102, or any combination thereof. The GPU 108 may include a cache (not shown), and can be configured to perform any number of graphics operations within the computing device 100. For example, the GPU 108 may be configured to render or manipulate graphics images, graphics frames, videos, or the like, to be displayed to a user of the computing device 100 at one or more display devices 110. Displaying image data may be carried out by one or more of engines 114 of the GPU 108, a display driver 116, a display interface 118, and the like. The display devices 110 may be implemented as external display devices, as internal display device, or any combination thereof.

In some cases, the engines 114 may be configured to perform shape changes as directed by instructions of a controller 120. In some cases, the controller 120 may be implemented as logic, at least partially comprising hardware logic. In other cases, the controller 120 may be implemented as a portion of software instructions of the display driver 116. Software instructions may be configured to be carried out by the engines 114 of the GPU 108, by the processing device 102, or any other suitable controller. In yet other cases, the controller 120 may be implemented as electronic logic, at least partially comprising hardware logic, to be carried out by electronic circuitry, circuitry to be carried out by an integrated circuit, and the like. The controller 120 may be configured to operate independently, in parallel, distributed, or as a part of a broader process. In yet other cases, the controller 120 may be implemented as a combination of software, firmware, hardware logic, and the like.

As discussed above, one or more of the display devices 110 may include a flexible display 122. The controller 120 may be configured to adjust a shape of the flexible display 122 by adjusting changes in electric force applied to an electroactive layer 124 coupled to the flexible display 122.

In some cases, the shape changes performed by the controller 120 include coiling of the flexible display 122 via changes in shape of the electroactive layer 124. As discussed above and in more detail below, coiling the flexible display may enable rolling up of the flexible display. The coiling may initiate by shaping a first coil turn having a first radius, and shaping a second coil turn having a second radius that is larger than the first radius. In other words, the first coil turn may be tighter than the second coil turn. These coil turns may be implemented by applying electrical force to the electroactive layer 124. Different radii may be achieved by applying a different electric force to different portions of the electroactive layer 124. For example, in order to achieve the first coil turn, a first voltage bias may be applied to a first portion of the electroactive layer 124. Once the first coil turn is formed, a second voltage bias that is less than the first voltage bias may be applied to a second portion of the electroactive layer 124.

In some cases, the shape of the flexible display 122 may be dependent upon characteristics of the electroactive material 124. For example, the electroactive material 124 may be composed of discrete sections wherein different current levels may be provided to different sections to generate more than one coil turn at the flexible display 122. As another example, the electroactive layer 124 may include discrete sections wherein voltage bias can be applied to each discrete section to generate a desired coil turn. Other characteristics, such as different resistances, flexors, and the like may be implemented generating different cells. In other words, the electroactive layer 124 may be comprised of a monolithic material having cells or sections that behave differently when an electric force is applied, or are electrically coupled to different levels of electric force, or any combination thereof. For simplicity, the techniques described herein may present the electroactive layer 124 as a monolithic material having multiple portions.

In some cases, once the second coil turn is formed around the first coil turn, the electric force applied to the portion of the electroactive layer 124 associated with the first coil turn may be relaxed. In this scenario, the portion of the electroactive layer 124 associated with the second coil turn may continue to have an electric force applied such that the first coil turn remains coiled, even after the electric force associated with the first coil turn has been relaxed. In this scenario, electricity may be preserved by only applying electrical force to form the second coil turn.

As discussed in more detail below in regard to FIG. 3, the electroactive layer 124 and the flexible display 122 may be coiled into a canister having a spindle. The coiling of the electroactive layer may turn the spindle of the canister providing ease of use for rolling up the flexible display 122. In this scenario, the canister may include some mechanical lock to retain the coil shape of the electroactive layer 124 and the flexible display. In this case, electricity may be preserved by not applying electrical force to form the coil turns once the flexible display 122 is rolled into the canister.

The memory device 106 can include random access memory (RAM), read only memory (ROM), flash memory, or any other suitable memory systems. For example, the memory device 106 may include dynamic random access memory (DRAM). The memory device 106 can include random access memory (RAM) (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems.

The processing device 102 may be a main processor that is adapted to execute the stored instructions. The processing device 102 may be a single core processor, a multi-core processor, a computing cluster, or any number of other configurations. The processing device 102 may be implemented as Complex Instruction Set Computer (CISC) or Reduced Instruction Set Computer (RISC) processors, x86 Instruction set compatible processors, multi-core, or any other microprocessor or central processing unit (CPU). The processing device 102 may be connected through a system bus 126 (e.g., Peripheral Component Interconnect (PCI), Industry Standard Architecture (ISA), PCI-Express, HyperTransport®, NuBus, etc.) to components including the memory 106 and the storage device 104. The processing device 102 may also be linked through the bus 126 to the display driver 116 and the display interface 118 configured to connect the computing device 100 to display devices 110 via a digital display interface. The display devices 110 may include a computer monitor, television, projector, among others, that are connected to the computing device 100.

In some cases, the computing device 100 may be a mobile computing device. In some cases, the display devices 110 may be mobile display devices to a mobile computing device.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
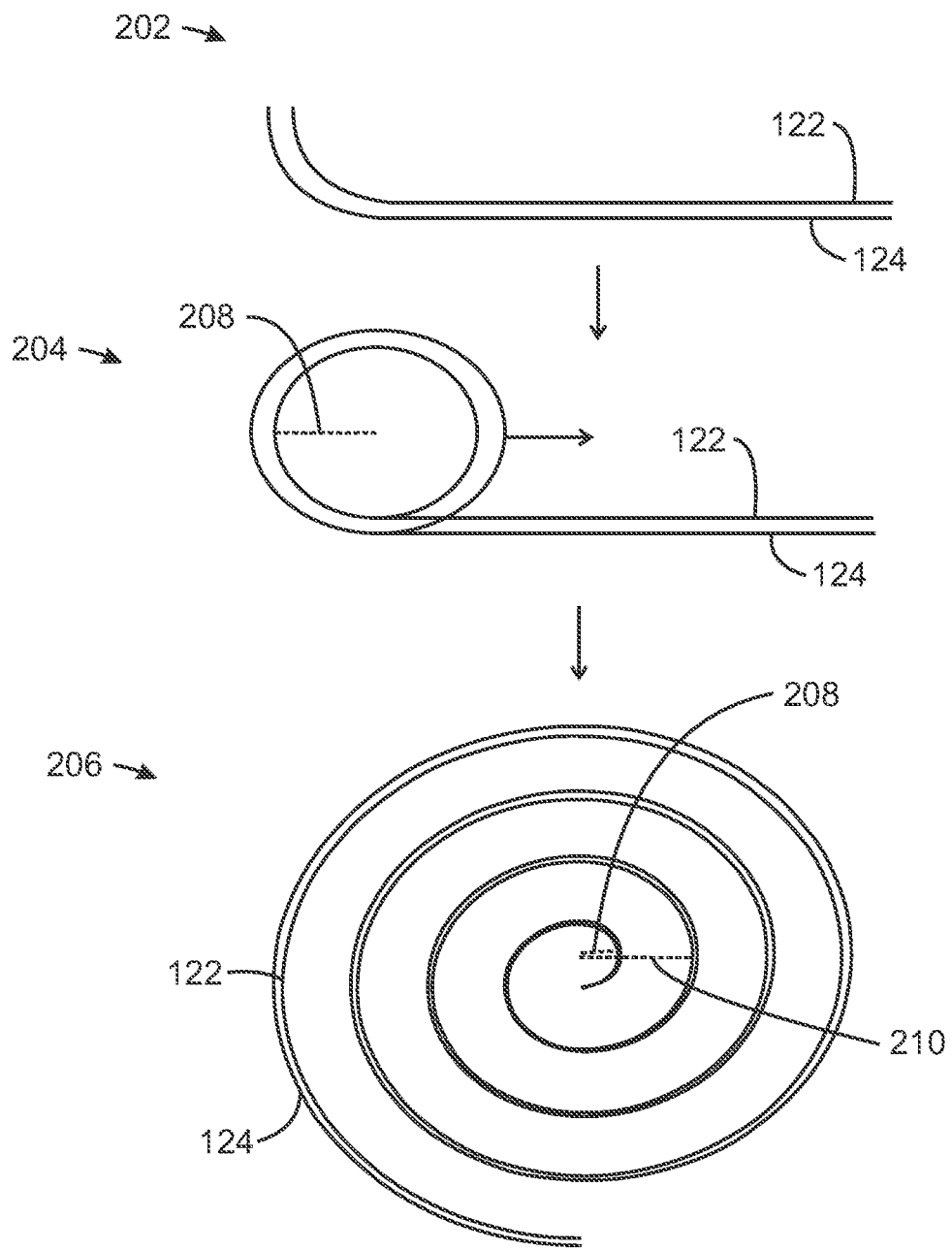
FIG. 2 is a diagram illustrating a side view of the flexible display being rolled up by activating an electroactive layer coupled to the flexible display.

FIG. 2 is a diagram illustrating a side view of the flexible display being rolled up by activating an electroactive layer coupled to the flexible display. In FIG. 2, the flexible display 122 and electroactive layer 124 are shown in various stages 202, 204, and 206. At 202, a first coil turn is beginning to form. At 204, a first coil turn is formed having a radius indicated by the dashed line 208. At 206, additional coil turns are illustrated as the flexible display 122 is completely coiled due to coil turns formed by the electroactive material. Further, at least a second coil turn includes a radius that is longer than the radius 208, as indicated by the dashed line 210.

The difference in length in the radius 208 versus the radius 210 may be achieved in order to generate the coil shape illustrated at 206. The coil shape illustrated at 206 may be achieved by applying different levels of electric force to different sections of the electroactive layer 124. For example, in order to generate a coil turn associated with the radius 208, electric force may be applied at 100% of the electric force available. In order to generate the coil turn associated with the radius 210, electric force may be applied at 80% of the available electric force. Additional coil turns may be generated accordingly using decreasing levels of electric force. Although FIG. 2 illustrates multiple coil turns being implemented, in some cases the electroactive material 124 may generate one coil turn depending on the size of the flexible display, a desired configuration, or any combination thereof.

Figure 3:
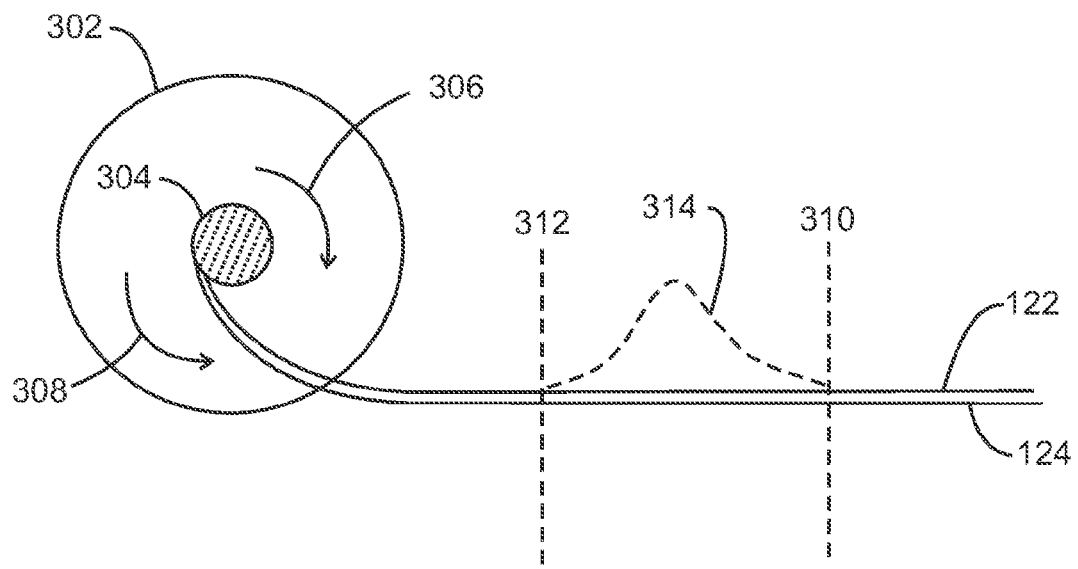
FIG. 3 is a diagram illustrating a side view of the flexible display being rolled up into a canister by activating an electroactive layer coupled to the flexible display.

FIG. 3 is a diagram illustrating a side view of the flexible display being rolled up into a canister by activating an electroactive layer coupled to the flexible display. As discussed above, the flexible display 124 may be rolled into a canister 302 by forming coil turns at the electroactive layer 124. The canister 302 may include a spindle 304 configured to rotate as the electroactive layer 124 begins to turn, as indicated by the arrow 306. In this scenario, the electroactive layer 124 is coupled to the spindle 304.

Rolling of the electroactive layer 124 may be performed in an inch-worm manner generating a rotation of the spindle 304. More specifically, in some cases, rolling of the electroactive layer 124 includes initiating a first coil turn a first radius, such as the first radius 208 of FIG. 2, and then at least partially straightening a portion of the first coil turn to rotate the spindle 304. Then, the straightened portion can be returned to the first radius 208. This process may continue for additional coil turns generating a rotation of the spindle 304 without rotating the canister 302.

Unrolling may also be achieved by reversing the process of forming the coil turns. For example, an outer coil turn may be gradually relaxed or straightened and thereby pushing the electroactive layer 122 and the flexible display 124 out of the canister 302, as indicated by the arrow 308.

In some cases, buckling of the flexible display 124 may occur during unrolling, as indicated by the dashed curve 310. In this scenario, the techniques described herein may include stiffening one or more sections of the electroactive layer to reduce the possibility of buckling. For example, a section of the electroactive layer 124 may be stiffened between the dashed lines 312 and 314. The stiffening of the electroactive layer 124 may increase an elastic modulus of the section between the dashed lines 213 and 314 in order to reduce the buckling indicated at 310.

Although in FIG. 3 the spindle 304 is described above as being rotatable in terms of the canister 302, in some cases, the entire canister 302 may roll as the coil turns are formed in the electroactive layer 124. In other words, the spindle 304 may turn as coil turns are formed generating a rotation of the canister 302 itself.

Figure 4:
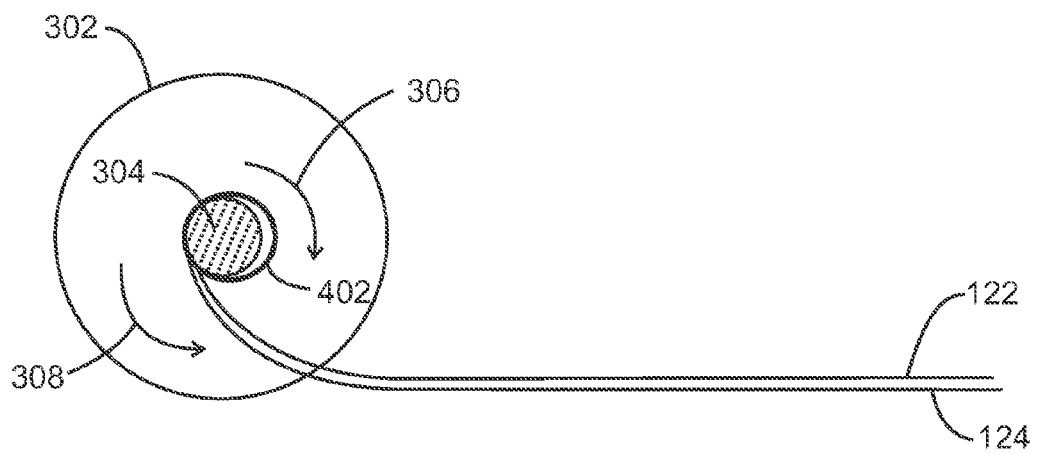
FIG. 4 is a diagram illustrating a side view of the flexible display being rolled up into a canister by activating an electroactive layer and a ring sleeve.

FIG. 4 is a diagram illustrating a side view of the flexible display being rolled up into a canister by activating an electroactive layer and a ring sleeve. In some cases, a ring sleeve 402 may be disposed around the spindle 304. In this scenario, the spindle 304 may turn as a result of a rotation in the ring sleeve 402, or the spindle 304 may not turn at all enabling only the ring sleeve 402 to rotate around the spindle 304 as coil turns are formed by the electroactive layer 124.

Figure 5:
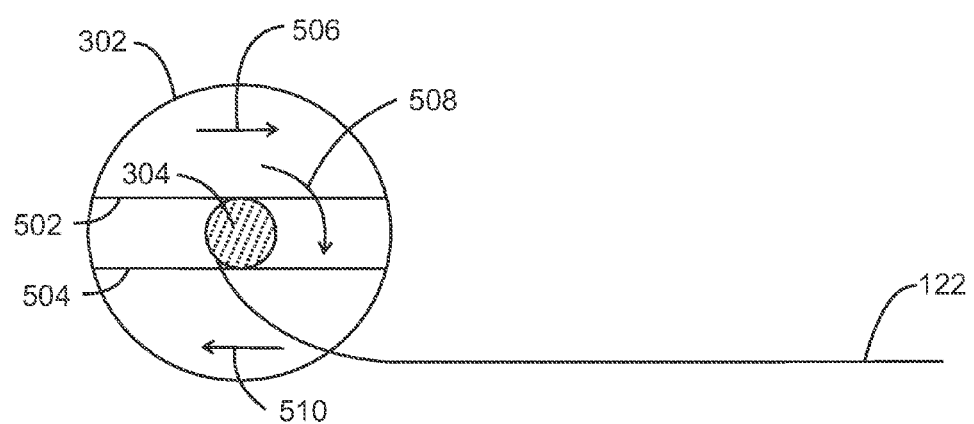
FIG. 5 is a diagram illustrating a side view of the flexible display being rolled up into a canister by activating an electroactive layer.

FIG. 5 is a diagram illustrating a side view of the flexible display being rolled up into a canister by activating an electroactive layer. Although in some cases an electroactive layer may be coupled to the flexible display 122, in FIG. 5, a first electroactive layer 502 and a second electroactive layer 504 may be used to coil the display. In FIG. 5, the first electroactive layer 502 and the second electroactive layer 504 may be coupled to the canister 302. Coiling may be achieved by shaping the first electroactive layer in a first direction 504 to turn the spindle 304, as indicated at 508. The second electroactive layer 504 may then elongate while the first electroactive layer is relaxed resulting in a movement in a second direction 510 to continue to turn the spindle 304. Although not illustrated in FIG. 5, shaping of the first electroactive layer 502, the second electroactive layer 504, or any combination thereof may include coiling, turning, straightening, extending, and the like in order to produce a twisting of the spindle 304.

Figure 6:
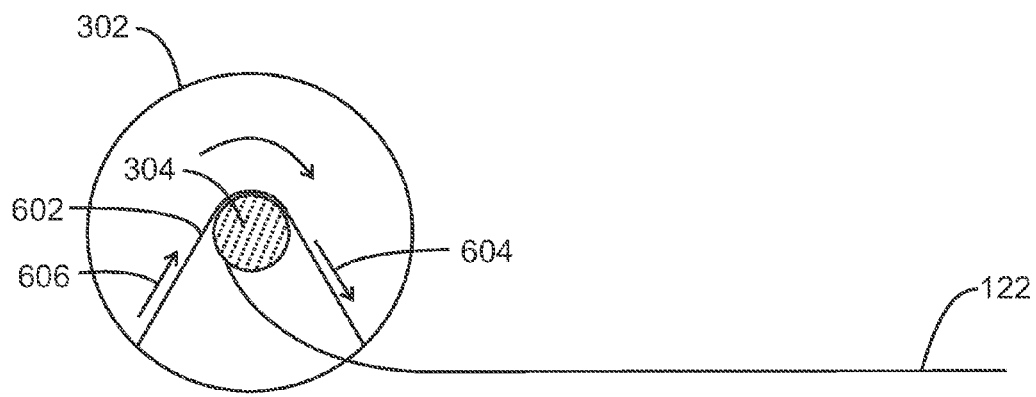
FIG. 6 is a diagram illustrating a side view of the flexible display being rolled up into a canister by activating an electroactive layer in an inch worm manner.

FIG. 6 is a diagram illustrating a side view of the flexible display being rolled up into a canister by activating an electroactive layer in an inch worm manner. As discussed above in regard to FIG. 3, an electroactive layer may be activated in an inch worm manner to turn the spindle 304. However, rather than being coupled to the flexible screen 122 as discussed above in regard to FIG. 3, in FIG. 6, an electroactive layer 602 may be disposed within the canister 302 and may be configured to rotate the spindle 304. Rotation in FIG. 6 may be achieved by selectively contracting, curling, or otherwise shaping some portions of the electroactive layer 602 while performing opposing actions on another portion. Specifically, a first section may be coiled, elongated, or otherwise shaped resulting in a pulling force indicated at 604 configured to turn the spindle 304. Once the first section is coiled, a second section may be coiled, elongated, or otherwise shaped resulting in a pushing force indicated at 606 configured to twist the spindle 304. Other shaping configurations are contemplated resulting in coiling of the flexible display 122 by way of the shaping of the electroactive layer 602.

Figure 7:
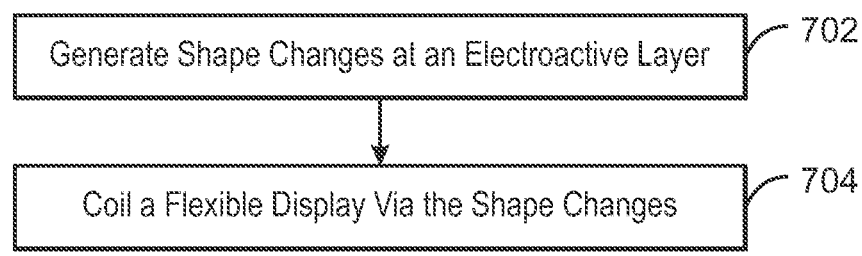
FIG. 7 is a block diagram illustrating a method for forming a shape changing flexible display.

FIG. 7 is a block diagram illustrating a method for forming a shape changing flexible display. As illustrated at block 702, the method 700 may include generating shape changes at an electroactive layer. At block 704, the method 700 may include coiling a flexible display via the shape changes.

In some cases, generating the shape changes may result in generating a first coil turn having a first radius, and generating a second coil turn having a second radius that is larger than the first radius. Generating the coil turns may also include applying one or more bias voltages to the electroactive layer. As discussed above in regard to FIG. 4, in some cases generating a first coil turn may include engaging a ring sleeve around the spindle to initiate rotation around the spindle.

The method 700 may also include receiving the first and second coil turns around a spindle of a canister. In this scenario, receiving the first and second coil turns around a spindle of a canister may include initiating the first coil turn at the first radius, and at least partially straightening a portion of the first coil turn to rotate the spindle of the canister. Further, receiving the first coil turn and the second coil turn around the spindle may include returning the straightened portion of the first coil turn to the first radius, and initiating the second coil turn at the second radius. Then, a portion of the second coil turn may be at least partially straightened to rotate the spindle of the canister.

In some cases, the method 700 may further include relaxing a first portion of the electroactive layer associated with the first coil turn by removing a first bias voltage at the first portion while maintaining a second bias voltage at a second portion of the electroactive layer associated with the second coil turn. In some cases, the method 700 may also include progressively straightening the second coil turn, and progressively straightening the first coil turn, wherein the progressive straightening of the second and first coil turn is configured to uncoil the flexible display.

As discussed above in regard to FIG. 3, buckling may occur during uncoiling. Therefore, in some cases the method 700 may include increasing an elastic modulus of a portion of the electroactive layer to reduce buckling of the flexible display as the flexible display is uncoiled.

Figure 8:
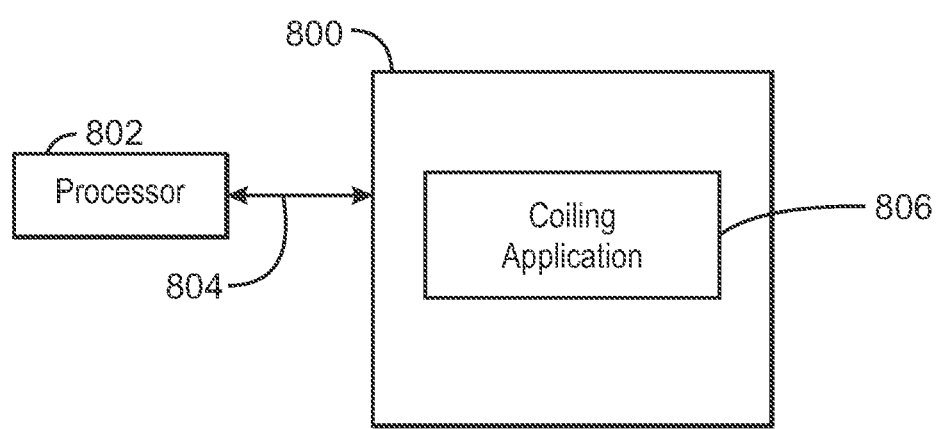
FIG. 8 is a block diagram depicting an example of a computer-readable medium configured to implement shape changes at a flexible display.

FIG. 8 is a block diagram depicting an example of a computer-readable medium configured to implement shape changes at a flexible display. The computer-readable medium 800 may be accessed by a processor 802 over a computer bus 804. In some examples, the computer-readable medium 800 may be a non-transitory computer-readable medium. In some examples, the computer-readable medium may be a storage medium. However, in any case, the computer-readable medium does not include transitory media such as carrier waves, signals, and the like. Furthermore, the computer-readable medium 800 may include computer-executable instructions to direct the processor 802 to perform the steps of the current method.

The various software components discussed herein may be stored on the tangible, non-transitory, computer-readable medium 800, as indicated in FIG. 8. For example, a coiling application 806 may be configured to generate shape changes of a flexible display, such as the flexible display 122 of FIG. 1. The shape changes include one or more coil turns configured to coil the flexible display 122.

Examples may include subject matter such as a method, means for performing acts of the method, at least one machine-readable medium including instructions that, when performed by a machine cause the machine to performs acts of the method. It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

Example 1 is an apparatus for coiling a display. In this example, the wireless charging device may include a flexible display, and an electroactive layer configured to generate shape changes in the flexible display, the shape changes comprising one or more coil turns configured to coil the flexible display.

Example 2 includes the apparatus of example 1. In this example, the one or more turns include a first coil turn having a first radius, and a second coil turn having a second radius that is larger than the first radius.

Example 3 includes the apparatus of any combination of examples 1-2. This example includes a controller having logic, at least partially comprising hardware logic, to generate the coil turns by applying one or more bias voltages to the electroactive layer.

Example 4 includes the apparatus of any combination of examples 1-3. This example includes a canister to receive the first and second coil turns around a spindle of the canister.

Example 5 includes the apparatus of any combination of examples 1-4. In this example, the logic is further configured to: initiate the first coil turn at the first radius, and at least partially straighten a portion of the first coil turn to rotate the spindle of the canister.

Example 6 includes the apparatus of any combination of examples 1-5. In this example, the logic is further configured to: return the straightened portion of the first coil turn to the first radius, initiate the second coil turn at the second radius, and at least partially straighten a portion of the second coil turn to rotate the spindle of the canister.

Example 7 includes the apparatus of any combination of examples 1-6. This example includes a ring sleeve around the spindle. In this example, the first portion is connected to the ring sleeve. In this example generating the first coil turns engages the ring sleeve to initiate rotation around the spindle.

Example 8 includes the apparatus of any combination of examples 1-7. In this example, the logic is further configured to relax a first portion of the electroactive layer associated with the first coil turn by removing a first bias voltage at the first portion while maintaining a second bias voltage at a second portion of the electroactive layer associated with the second coil turn.

Example 9 includes the apparatus of any combination of examples 1-8. In this example, the logic is configured to progressively: straighten the second coil turn, straighten the first coil turn. In this example progressive straightening of the second and first coil turn is configured to uncoil the flexible display.

Example 10 includes the apparatus of any combination of examples 1-9. In this example, the logic is configured to increase an elastic modulus of a portion of the electroactive layer to reduce buckling of the flexible display as the flexible display is uncoiled.

Example 11 is a method for rolling a display. In this example, the wireless charging device may include generating shape changes at an electroactive layer, coiling a flexible display via the shape changes comprising one or more coil turns.

Example 12 includes the method of example 11. In this example generating the one or more turns may include generating a first coil turn having a first radius, and generating a second coil turn having a second radius that is larger than the first radius.

Example 13 includes the method of any combination of examples 11-12. In this example generating the coil turns may include applying one or more bias voltages to the electroactive layer.

Example 14 includes the method of any combination of examples 11-13. This example includes receiving the first and second coil turns around a spindle of a canister.

Example 15 includes the method of any combination of examples 11-14. In this example receiving the first coil turn around the spindle may include initiating the first coil turn at the first radius, and at least partially straightening a portion of the first coil turn to rotate the spindle of the canister.

Example 16 includes the method of any combination of examples 11-15. In this example receiving the first coil turn and the second coil turn around the spindle may include returning the straightened portion of the first coil turn to the first radius, initiating the second coil turn at the second radius, and at least partially straightening a portion of the second coil turn to rotate the spindle of the canister.

Example 17 includes the method of any combination of examples 11-16. In this example generating the first coil turn further may include engaging a ring sleeve around the spindle to initiate rotation around the spindle.

Example 18 includes the method of any combination of examples 11-17. This example includes relaxing a first portion of the electroactive layer associated with the first coil turn by removing a first bias voltage at the first portion while maintaining a second bias voltage at a second portion of the electroactive layer associated with the second coil turn.

Example 19 includes the method of any combination of examples 11-18. This example includes progressively: straightening the second coil turn, straightening the first coil turn. In this example, the progressive straightening of the second and first coil turn is configured to uncoil the flexible display.

Example 20 includes the method of any combination of examples 11-19. This example includes increasing an elastic modulus of a portion of the electroactive layer to reduce buckling of the flexible display as the flexible display is uncoiled.

Example 21 is a system for coiling a display. In this example, the wireless charging device may include a flexible display, and an electroactive layer configured to generate shape changes in the flexible display, the shape changes comprising one or more coil turns configured to coil the flexible display. a controller having logic, at least partially comprising hardware logic, to generate the one or more coil turns.

Example 22 includes the system of example 21. In this example, the one or more turns include a first coil turn having a first radius, and a second coil turn having a second radius that is larger than the first radius.

Example 23 includes the system of any combination of examples 21-22. In this example, the logic is configured to generate the coil turns by applying one or more bias voltages to the electroactive layer.

Example 24 includes the system of any combination of examples 21-23. This example includes a canister to receive the first and second coil turns around a spindle of the canister.

Example 25 includes the system of any combination of examples 21-24. In this example, the logic is further configured to: initiate the first coil turn at the first radius, and at least partially straighten a portion of the first coil turn to rotate the spindle of the canister.

Example 26 includes the system of any combination of examples 21-25. In this example, the logic is further configured to: return the straightened portion of the first coil turn to the first radius, initiate the second coil turn at the second radius, and at least partially straighten a portion of the second coil turn to rotate the spindle of the canister.

Example 27 includes the system of any combination of examples 21-26. This example includes a ring sleeve around the spindle. In this example, the first portion is connected to the ring sleeve. In this example generating the first coil turns engages the ring sleeve to initiate rotation around the spindle.

Example 28 includes the system of any combination of examples 21-27. In this example, the logic is further configured to relax a first portion of the electroactive layer associated with the first coil turn by removing a first bias voltage at the first portion while maintaining a second bias voltage at a second portion of the electroactive layer associated with the second coil turn.

Example 29 includes the system of any combination of examples 21-28. In this example, the logic is configured to progressively: straighten the second coil turn, straighten the first coil turn. In this example progressive straightening of the second and first coil turn is configured to uncoil the flexible display.

Example 30 includes the system of any combination of examples 21-29. In this example, the logic is configured to increase an elastic modulus of a portion of the electroactive layer to reduce buckling of the flexible display as the flexible display is uncoiled.

Example 31 is an apparatus for coiling a display. In this example, the wireless charging device may include a flexible display, and an electroactive layer configured to generate shape changes in the flexible display, the shape changes comprising one or more coil turns configured to coil the flexible display.

Example 32 includes the apparatus of example 31. In this example, the one or more coil turns include a first coil turn having a first radius, and a second coil turn having a second radius that is larger than the first radius.

Example 33 includes the apparatus of any combination of examples 31-32. This example includes a means to generate the coil turns by applying one or more bias voltages to the electroactive layer.

Example 34 includes the apparatus of any combination of examples 31-33. This example includes a canister to receive the first and second coil turns around a spindle of the canister.

Example 35 includes the apparatus of any combination of examples 31-34. In this example, the means to generate the coil turns is further configured to: initiate the first coil turn at the first radius, and at least partially straighten a portion of the first coil turn to rotate the spindle of the canister.

Example 36 includes the apparatus of any combination of examples 31-35. In this example, the means to generate the coil turns is further configured to: return the straightened portion of the first coil turn to the first radius, initiate the second coil turn at the second radius, and at least partially straighten a portion of the second coil turn to rotate the spindle of the canister.

Example 37 includes the apparatus of any combination of examples 31-36. This example includes a ring sleeve around the spindle. In this example, the first portion is connected to the ring sleeve. In this example generating the first coil turns engages the ring sleeve to initiate rotation around the spindle.

Example 38 includes the apparatus of any combination of examples 31-37. In this example, the means to generate the coil turns is further configured to relax a first portion of the electroactive layer associated with the first coil turn by removing a first bias voltage at the first portion while maintaining a second bias voltage at a second portion of the electroactive layer associated with the second coil turn.

Example 39 includes the apparatus of any combination of examples 31-38. In this example, the means to generate the coil turns is configured to progressively: straighten the second coil turn, straighten the first coil turn. In this example progressive straightening of the second and first coil turn is configured to uncoil the flexible display.

Example 40 includes the apparatus of any combination of examples 31-39. In this example, the means to generate the coil turns is configured to increase an elastic modulus of a portion of the electroactive layer to reduce buckling of the flexible display as the flexible display is uncoiled.

Example 41 is a system for coiling a display. In this example, the wireless charging device may include a flexible display, and an electroactive layer configured to generate shape changes in the flexible display, the shape changes comprising one or more coil turns configured to coil the flexible display. a means for generating the one or more coil turns.

Example 42 includes the system of example 41. In this example, the one or more coil turns include a first coil turn having a first radius, and a second coil turn having a second radius that is larger than the first radius.

Example 43 includes the system of any combination of examples 41-42. In this example, the means for generating the one or more coil turns is configured to generate the coil turns by applying one or more bias voltages to the electroactive layer.

Example 44 includes the system of any combination of examples 41-43. This example includes a canister to receive the first and second coil turns around a spindle of the canister.

Example 45 includes the system of any combination of examples 41-44. In this example, the means for generating the one or more coil turns is further configured to: initiate the first coil turn at the first radius, and at least partially straighten a portion of the first coil turn to rotate the spindle of the canister.

Example 46 includes the system of any combination of examples 41-45. In this example, the means for generating the one or more coil turns is further configured to: return the straightened portion of the first coil turn to the first radius, initiate the second coil turn at the second radius, and at least partially straighten a portion of the second coil turn to rotate the spindle of the canister.

Example 47 includes the system of any combination of examples 41-46. This example includes a ring sleeve around the spindle. In this example, the first portion is connected to the ring sleeve. In this example generating the first coil turns engages the ring sleeve to initiate rotation around the spindle.

Example 48 includes the system of any combination of examples 41-47. In this example, the means for generating the one or more coil turns is further configured to relax a first portion of the electroactive layer associated with the first coil turn by removing a first bias voltage at the first portion while maintaining a second bias voltage at a second portion of the electroactive layer associated with the second coil turn.

Example 49 includes the system of any combination of examples 41-48. In this example, the means for generating the one or more coil turns is configured to progressively: straighten the second coil turn, straighten the first coil turn. In this example progressive straightening of the second and first coil turn is configured to uncoil the flexible display.

Example 50 includes the system of any combination of examples 41-49. In this example, the means for generating the one or more coil turns is configured to increase an elastic modulus of a portion of the electroactive layer to reduce buckling of the flexible display as the flexible display is uncoiled.

In the above description and the following claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices.

An embodiment is an implementation or example. Reference in the present specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for coiling a display, comprising:
a flexible display;
an electroactive layer configured to generate shape changes in the flexible display, the shape changes comprising a first coil turn and a second coil turn configured to coil the flexible display; and
a controller comprising logic, at least partially comprising hardware logic, to generate a first bias voltage at a first portion of the electroactive layer associated with the first coil turn and a second bias voltage at a second portion of the electroactive layer associated with the second coil turn, wherein the logic is further configured to relax the first portion of the electroactive layer associated with the first coil turn by removing the first bias voltage at the first portion while maintaining the second bias voltage at the second portion of the electroactive layer associated with the second coil turn to selectively shape portions of the electroactive layer.

2. The apparatus of claim 1, wherein:
the first coil turn has a first radius; and
the second coil turn has a second radius that is larger than the first radius.

3. The apparatus of claim 1, further comprising a canister to receive the first and second coil turns around a spindle of the canister.

4. The apparatus of claim 3, wherein the logic is further configured to:
initiate the first coil turn at the first radius; and at least partially straighten a portion of the first coil turn to rotate the spindle of the canister.

5. The apparatus of claim 4, wherein the logic is further configured to:
return the straightened portion of the first coil turn to the first radius;
initiate the second coil turn at the second radius; and
at least partially straighten a portion of the second coil turn to rotate the spindle of the canister.

6. The apparatus of claim 3, further comprising a ring sleeve around the spindle, wherein the first portion is connected to the ring sleeve, wherein generating the first coil turns engages the ring sleeve to initiate rotation around the spindle.

7. The apparatus of claim 1, wherein the logic is configured to progressively:
straighten the second coil turn;
straighten the first coil turn, wherein progressive straightening of the second and first coil turn is configured to uncoil the flexible display.

8. The apparatus of claim 7, wherein the logic is configured to increase an elastic modulus of a portion of the electroactive layer to reduce buckling of the flexible display as the flexible display is uncoiled.

9. A system for coiling a display, comprising:
a flexible display;
an electroactive layer configured to generate shape changes in the flexible display, the shape changes comprising a first coil turn and a second coil turn configured to coil the flexible display; and
a controller comprising logic, at least partially comprising hardware logic, to generate a first bias voltage at a first portion of the electroactive layer associated with the first coil turn and a second bias voltage at a second portion of the electroactive layer associated with the second coil turn, wherein the logic is further configured to relax the first portion of the electroactive layer associated with the first coil turn by removing the first bias voltage at the first portion while maintaining the second bias voltage at the second portion of the electroactive layer associated with the second coil turn to selectively shape portions of the electroactive layer.

10. The system of claim 9, wherein:
the first coil turn has a first radius; and
the second coil turn has a second radius that is larger than the first radius.

11. The system of claim 10, further comprising a canister to receive the first and second coil turns around a spindle of the canister, wherein the logic is further configured to:
initiate the first coil turn at the first radius; and
straighten a portion of the first coil turn to rotate the spindle of the canister;
return the straightened portion of the first coil turn to the first radius;
initiate the second coil turn at the second radius; and
straighten a portion of the second coil turn to rotate the spindle of the canister.

12. The system of claim 11, wherein the logic is further configured to relax the first portion of the electroactive layer associated with the first coil turn by removing the first bias voltage at the first portion while maintaining the second bias voltage at the second portion of the electroactive layer associated with the second coil turn.

13. The system of claim 9, wherein the logic is further configured to progressively:
straighten the second coil turn;
straighten the first coil turn, wherein progressive straightening of the second and first coil turn is configured to uncoil the flexible display, and wherein the logic is configured to increase an elastic modulus of a portion of the electroactive layer to reduce buckling of the flexible display as the flexible display is uncoiled.

* * * * *